US012792683B2

(12) United States Patent
Danna et al.

(10) Patent No.: US 12,792,683 B2
(45) Date of Patent: Nov. 10, 2026

(54) SYSTEMS AND METHODS FOR DYNAMICALLY AUTOMATING SUBMISSIONS

(71) Applicant: Capital One Services, LLC, McLean, VA (US)

(72) Inventors: Russell Danna, Rockwall, TX (US); Robert Dunnigan, Little Elm, TX (US); Michael Garner, Carrollton, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 314 days.

(21) Appl. No.: 18/586,798

(22) Filed: Feb. 26, 2024

(65) Prior Publication Data

US 2025/0272352 A1 Aug. 28, 2025

(51) Int. Cl.

*G06F 16/958* (2019.01)
*G06F 40/174* (2020.01)
*G06F 40/18* (2020.01)

(52) U.S. Cl.

CPC .......... *G06F 16/986* (2019.01); *G06F 40/174* (2020.01); *G06F 40/18* (2020.01)

(58) Field of Classification Search

CPC ............................... G06F 40/174; G06F 40/18
See application file for complete search history.

(56) References Cited

U.S. PATENT DOCUMENTS 11,086,894 B1 * 8/2021 Srivastava .......... G06F 16/2282
2015/0193123 A1 * 7/2015 Inukonda ............... G06Q 10/10 715/780
2021/0409518 A1 * 12/2021 Logan ..................... H04L 67/51
2023/0073463 A1 * 3/2023 Agarwal ............... G06F 16/258
2023/0107316 A1 * 4/2023 Ripa ...................... G06V 30/10 700/29
2023/0108015 A1 * 4/2023 Mayer ..................... G06F 40/30 704/9

* cited by examiner

*Primary Examiner* — Asher D Kells
(74) *Attorney, Agent, or Firm* — TROUTMAN PEPPER LOCKE LLP; Christopher J. Forstner; John A. Morrissett

(57) ABSTRACT

Disclosed embodiments may include a method for dynamically automating submissions. The method may include receiving tabular data and one or more associations of columns from the tabular data to fields on a webpage for one or more submissions, and extracting column data from the tabular data, determining, using a first machine learning model, one or more suggested associations for the fields on the webpage based on data types for the fields, and determining, using a second machine learning model, one or more suggested associations for the fields based on column names of the extracted column data. In response to determining one or more suggested associations, sending to a user device the one or more suggested associations, receiving, from the user device, accepted suggested associations; and transmitting one or more submissions for each row in the tabular data using the one or more suggested associations and the accepted suggested associations.

19 Claims, 3 Drawing Sheets

SYSTEMS AND METHODS FOR DYNAMICALLY AUTOMATING SUBMISSIONS

The disclosed technology relates to dynamically automating submissions from sources such as spreadsheets or tabular text files by using machine learning models to determine suggested associations for fields on webpages.

BACKGROUND

Automatic submission methods do not utilize machine learning models to help determine suggested associations for fields on webpages. Submitting similar submissions numerous times can be frustrating for users, cause system and data errors, and may ultimately cause users to waste valuable time and resources.

Accordingly, there is a need for improved systems and methods for dynamically automating submissions. Embodiments of the present disclosure are directed to this and other considerations.

SUMMARY

Disclosed embodiments may include a system for dynamically automating submissions. The system may include one or more processors, and memory in communication with the one or more processors and storing instructions that, when executed by the one or more processors, are configured to cause the system to dynamically automate submissions. The system may receive, from a user device, tabular data and one or more associations of columns from the tabular data to fields on a webpage for one or more submissions, extract column data from the tabular data, determine, using a first machine learning model, one or more suggested associations for the fields on the webpage based on data types for the fields and the extracted column data, determine, using a second machine learning model, one or more suggested associations for the fields on the webpage based on field names on the webpage and column names of the extracted column data, responsive to determining one or more suggested associations, sending to the user device the one or more suggested associations for the fields on the webpage, receive, from the user device, accepted suggested associations for the fields on the webpage, and transmit, via an API, one or more submissions for each row in the tabular data using the one or more suggested associations and the accepted suggested associations.

Disclosed embodiments may include a system for dynamically automating submissions. The system may include one or more processors, and memory in communication with the one or more processors and storing instructions that, when executed by the one or more processors, are configured to cause the system to dynamically automate submissions. The system may receive, from a database, tabular data for one or more submissions, extract column data from the tabular data, determine, using a first machine learning model, one or more suggested associations for fields on a webpage based on data types for the fields and the extracted column data, responsive to determining one or more suggested associations, sending to a user device the one or more suggested associations for the fields on the webpage, receive, from the user device, one or more accepted suggested associations for the fields on the webpage, and transmit, via an API, one or more submissions for each row in the tabular data using the one or more suggested associations and the one or more accepted suggested associations.

Disclosed embodiments may include a system for dynamically automating submissions. The system may include one or more processors, and memory in communication with the one or more processors and storing instructions that, when executed by the one or more processors, are configured to cause the system to dynamically automate submissions. The system may receive, from a user device, tabular data and one or more associations of columns from the tabular data to fields on a webpage for one or more submissions, extract column data and row data from the tabular data, and transmit, via an API, one or more submissions for each row in the tabular data using the one or more associations of columns.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Figure 1:
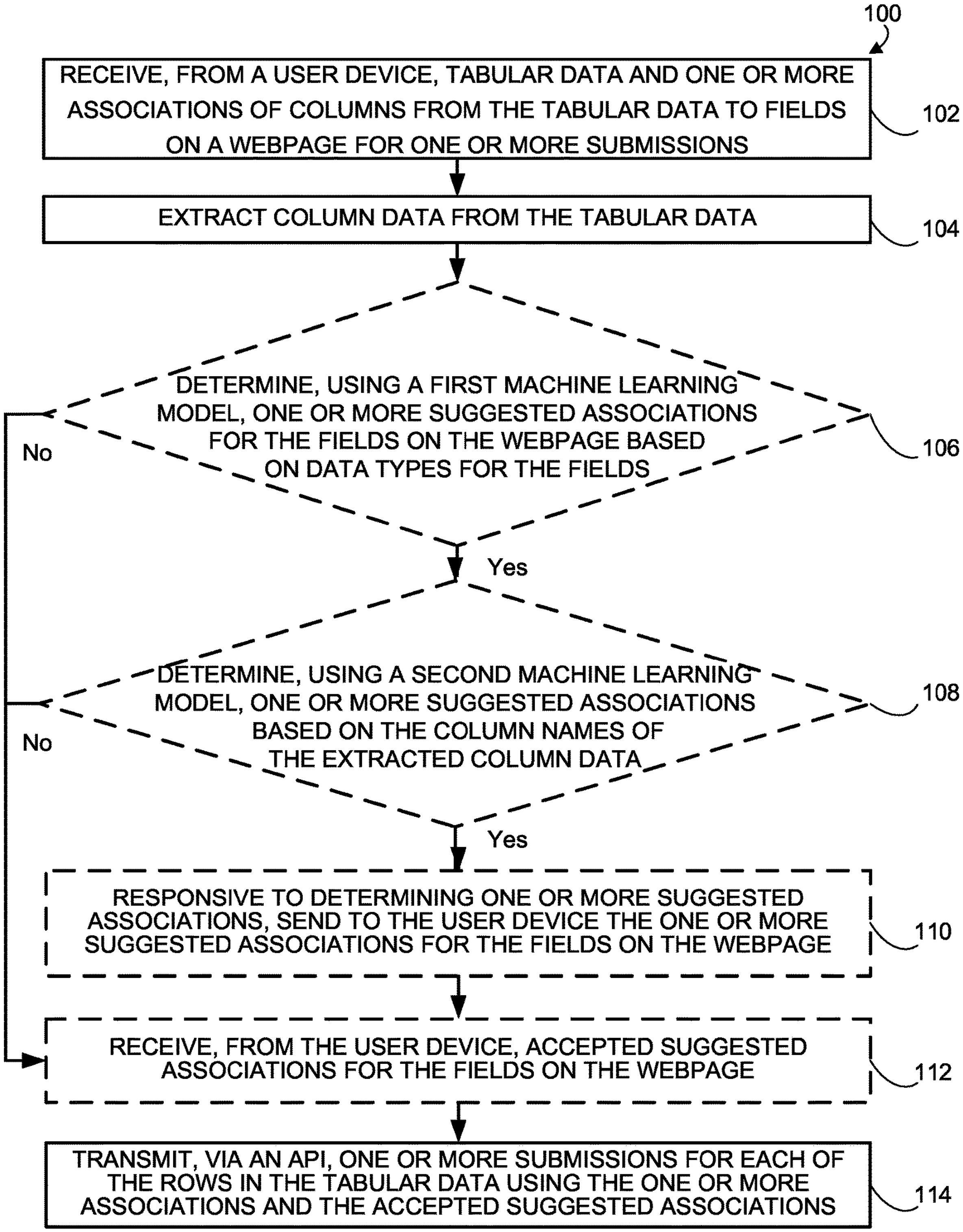
FIG. 1 is a flow diagram illustrating an exemplary method for dynamically automating submissions in accordance with certain embodiments of the disclosed technology.

Examples of the present disclosure relate to systems and methods for dynamically automating submissions. More particularly, the disclosed technology relates to dynamically automating submissions to determine suggested associations for fields on webpages. Automating submissions may include submissions on a webpage related to documents, questionnaires, forms, transactions, or the like. For example, a user may need to enter data on a webpage for a submission for different items or transactions multiple times. In order to complete each submission, a user may refer to a spreadsheet, tabular text, or CSV file with a list of each transaction that needs to be submitted on the website. Manually entering the transactions into the website may be tedious and time consuming. Additionally, manual submissions may result in multiple errors if the information is not transcribed from the spreadsheet to the fields on the webpage correctly. Automating the submission process is necessary. The process of automating submissions may also be complicated when a user needs to link each column in a spreadsheet to a field on the webpage. If the spreadsheet is altered in future submissions, columns from the spreadsheet may need to be relinked to fields on the webpage. A system and method for dynamically automating submissions is needed.

A solution to this problem includes using a machine learning model that may use the column headers in the spreadsheet and compare the column header names to the field names on the webpage. The machine learning model may also compare the data type of the entries in the spreadsheet to the required data entry for the fields on the webpage. Using the comparison of the column header names and the data types of the columns, a system may recommend what column in a spreadsheet should be linked to a field on a webpage. Thus, if a spreadsheet is altered in the future and the columns change positions or data types, the system may dynamically recommend different pairing between the columns and the fields on the webpage.

The systems and methods described herein utilize, in some instances, machine learning models, which are necessarily rooted in computers and technology, for making one or more determinations. Machine learning models are a unique computer technology that involves training models to complete tasks and make decisions. The present disclosure may include using one or more machine learning models to determine suggested associations for a webpage based on data types or field names for fields on the webpage and entries in tabular data. This, in some examples, may involve using column data extracted from tabular data and a machine learning model, applied and trained to analyze the field names and data types required for a webpage along with the available data types of the column data and column names of the column data, and outputs a result of suggested associations between the column data and fields on the webpage. Using a machine learning model in this way may allow the system to automate submissions and reduce processing times of submissions. This is a clear advantage and improvement over prior methods that may require users to unify multiple spreadsheets or tabular data for numerous submissions because information in tabular data may vary between different files. The present disclosure solves this problem by using machine learning models to suggest associations between data in tabular data and fields on a webpage regardless of the order of the entries on the tabular data. Furthermore, examples of the present disclosure may also improve the speed with which computers may complete automatic submissions because the machine learning models described herein may help simplify submissions by predicting what column data should be matched to fields on webpages. Overall, the systems and methods disclosed have significant practical applications in the submission field because of the noteworthy improvements of the machine learning models using tabular data as inputs to dynamically suggest associations to fields on webpages, which are important to solving present problems with this technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a flow diagram illustrating an exemplary method 100 for dynamically automating submissions, in accordance with certain embodiments of the disclosed technology. The steps of method 100 may be performed by one or more components of the system 300 (e.g., dynamic submission automation system 220 or web server 310 of automation system 308 or user device 302), as described in more detail with respect to FIGS. 2 and 3.

In block 102, the dynamic submission automation system 220 may receive from a user device 302, tabular data and one or more associations of columns from the tabular data to fields on a webpage for one or more submissions. The dynamic submission automation system 220 may receive the tabular data and the one or more associations from the user device 302 via a browser extension, a mobile application, or both. In some embodiments, a user may select a spreadsheet, tabular data, or a CSV file, with the tabular data and send it to the dynamic submission automation system 220. In some embodiments, the dynamic submission automation system 220 may receive a location of the tabular data and transmit an API call with the location of the tabular data to retrieve the tabular data. The tabular data may be saved in a cloud or locally in a system. The tabular data may also be saved on a database, or in other words, the spreadsheet, tabular data, or CSV file can be retrieved from a database or other source.

In block 104, the dynamic submission automation system 220 may extract column data from the tabular data. In some embodiments, each row of the tabular data may be related to one submission for the webpage. A column of the tabular data may be associated with a field on the webpage. The dynamic submission automation system 220 needs associations between column data and the fields on the webpage to ensure that correct information is submitted for each submission for each field on the webpage. In some examples, the dynamic submission automation system 220 can receive a plurality of spreadsheets or tabular data, extract a plurality of column data from the plurality of spreadsheets, and track the tabular data or spreadsheet source for each of the plurality of column data. The dynamic submission automation system 220 may move to optional blocks 106 and 108 to determine one or more suggested associations for the submissions for the webpage.

In optional block 106, the dynamic submission automation system 220 may determine, using a first machine learning model, one or more suggested associations for the fields on the webpage based on data types for the fields and the extracted column data. In some embodiments, the dynamic automation submission system 220 extracts fields from the webpage, and then uses the first machine learning model to determine the one or more suggested associations for the fields on the webpage. If the dynamic submission automation system 220 determines there are one or more suggested associations for the fields on the webpage based on data types for the fields and the extracted column data, then the dynamic submission automation system 220 moves to optional block 108. Otherwise, the dynamic submission automation system 220 moves to optional block 112. The one or more suggested associations may include associations between the entries in the extracted column data and fields on the webpage. The dynamic submission automation system 220 uses the first machine model to determine the one or more suggested associations by determining a required data type for a field and then determining whether one or more columns of the extracted column data includes the required data type. A column of entries in the extracted column data may be the same data type. Data types of the entries in the extracted column data may include strings, timestamps, URLs, UUIDs, phone numbers, addresses, email addresses, floats, characters, dates, Booleans, doubles, integers, longs, shorts, any known pattern types identified with a regular expression (RegEx), or a combination thereof. A field on the webpage may also be a data type of strings, timestamps, URLs, UUIDs, phone numbers, addresses, email addresses, floats, characters, dates, Booleans, doubles, integers, longs, shorts, any known pattern types identified with a RegEx, any HTML input type as outlined in https://www.w3schools.com/tags/tag_input.asp, or a combination thereof. In some embodiments, when the dynamic submission automation system 220 determines the one or more suggested association using the first machine learning model, the dynamic submission automation system 220 may determine that a column of entries should not be a suggested association to a field on the webpage because the data type of the column of entries is not the same as the data type of the field on the webpage. In some embodiments, more than one column of entries may have the same data type, and it may be difficult for the dynamic submission automation system 220 to suggest an association to a field on the webpage. In some embodiments, the dynamic submission automation system 220 can use the id attributes of the fields to determine if one or more columns of the extracted column data should be matched to the field on the webpage. To narrow down to an accurate suggested association, the dynamic submission automation system 220 may optionally move to block 108 to further narrow the suggested association.

In optional block 108, the dynamic submission automation system 220 may determine, using a second machine learning model, one or more suggested associations for the fields on the webpage based on the field names on the webpage and column names of the extracted column data. If the dynamic submission automation system 220 determines there are one or more suggested associations for the fields on the webpage based on the field names on the webpages and column names of the extracted column data, then the dynamic submission automation system 220 moves to optional block 110. Otherwise, the dynamic submission automation system 220 moves to optional block 112. In some embodiments, the first entry of a column of entries of the same data type may have a column name. The dynamic submission automation system 220 may use the second machine learning model to determine the one or more suggested associations by determining whether one or more column names are within a predetermined contextual range of the field names. In some embodiments, the predetermined contextual range of the field names can cover a percentage of available contextual language, can be tailored to jargon, can be tailored to jargon in addition to natural language, or other predetermined contextual range of field names known in the art. In this example, the dynamic submission automation system 220 compares the column names to the field names on the webpage to determine if a column should be associated with the field on the webpage. In some embodiments, the dynamic submission automation system 220 can use cosine similarities between contextual word embeddings to match similar terms between the column names and the field names. In some embodiments, the dynamic submission automation system 220 can determine the contextual range by choosing a static threshold value or the first major gap in values based on the cosine similarities. In one example, if the cosine similarities had the values of 0.92, 0.93, 0.91, 0.89, 0.86, 0.71, and 0.52, the static threshold can be set to 0.9 which would return 0.92, 0.93, and 0.91. Alternatively, if the dynamic submission automation system 220 uses the first major gap in the values, the first major gap would be between 0.86 and 0.71, which would return 0.92, 0.93, 0.91, 0.89, and 0.86. In some embodiments, the dynamic submission automation system 220 can use Word2vec for vector word embedding as a part of the cosine similarity check as outlined above. In some embodiments, if the dynamic submission automation system 220 had multiple columns potentially associated to a field on the webpage, the dynamic submission automation system 220 may further narrow the column entry that should be matched to the field on the webpage based on the determination from comparing the column names to the field names of the webpage.

In optional block 110, the dynamic submission automation system 220 may, in response to determining one or more suggested associations, send to the user device 302 the one or more suggested associations for the fields on the webpage. When the one or more suggested associations are sent to the user device 302, a user of the user device 302 may review the one or more suggested associations to confirm if the one or more suggested associations are accurate or should be modified. By allowing the user to review the one or more suggested associations, the user may provide the dynamic submission automation system 220 with accepted suggested associations. The dynamic submission automation system 220 may then correct associations between the extracted column data and the fields on the webpage.

In optional block 112, the dynamic submission automation system 220 may receive from the user device 302, accepted suggested associations for the fields on the webpage. In some embodiments, the dynamic submission automation system 220 may also receive from the user device 302, one or more alternative associations for the fields on the webpage. If the user denies a suggested association for a field on the webpage, the user may provide an alternative association between an extracted column data and the field on the webpage. The dynamic submission automation system 220 may retrain the first machine learning model and the second machine learning model using the accepted suggested associations. The dynamic submission automation system 220 can confirm if the data type of the suggested association for a field on the webpage matches the data type of the alternative association for the field on the webpage. If the data type of the suggested association for the field on the webpage does not match the data type of the alternative association, the dynamic submission automation system 220 may retrain the first machine learning model so that future suggested associations may be more accurate. The dynamic submission automation system 220 may also compare the column names and field names for the suggested associations to the column names and field names of the alternative association to determine if the second machine learning model should be retrained.

In block 114, the dynamic submission automation system 220 may transmit, via an API, one or more submissions for each of the rows in the tabular data using the one or more associations and the accepted suggested associations. In this example, the one or more associations may include the one or more alternative associations received by the user device in block 112. By transmitting the one or more submission for each of the rows in the tabular data, the dynamic submission automation system 220 may save the user time and resources that would have been required if the one or more submissions would have been manually submitted. In some examples, if the webpage requires a second page of fields to be filled for a submission, the dynamic submission automation system 220 may repeat blocks 102 to 114 to generate one or more additional suggested associations between the columns of the tabular data and the fields on the second webpage. This process may be repeated for additional webpages.

Figure 2:
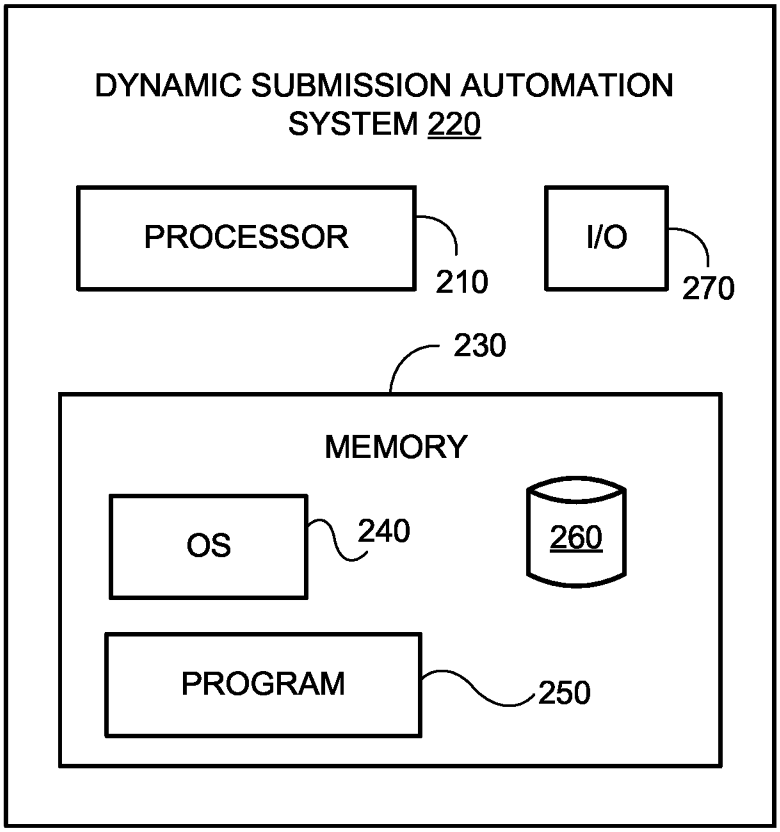
FIG. 2 is a block diagram of an example dynamic submission automation system used to provide dynamically automating submissions, according to an example implementation of the disclosed technology.
Figure 3:
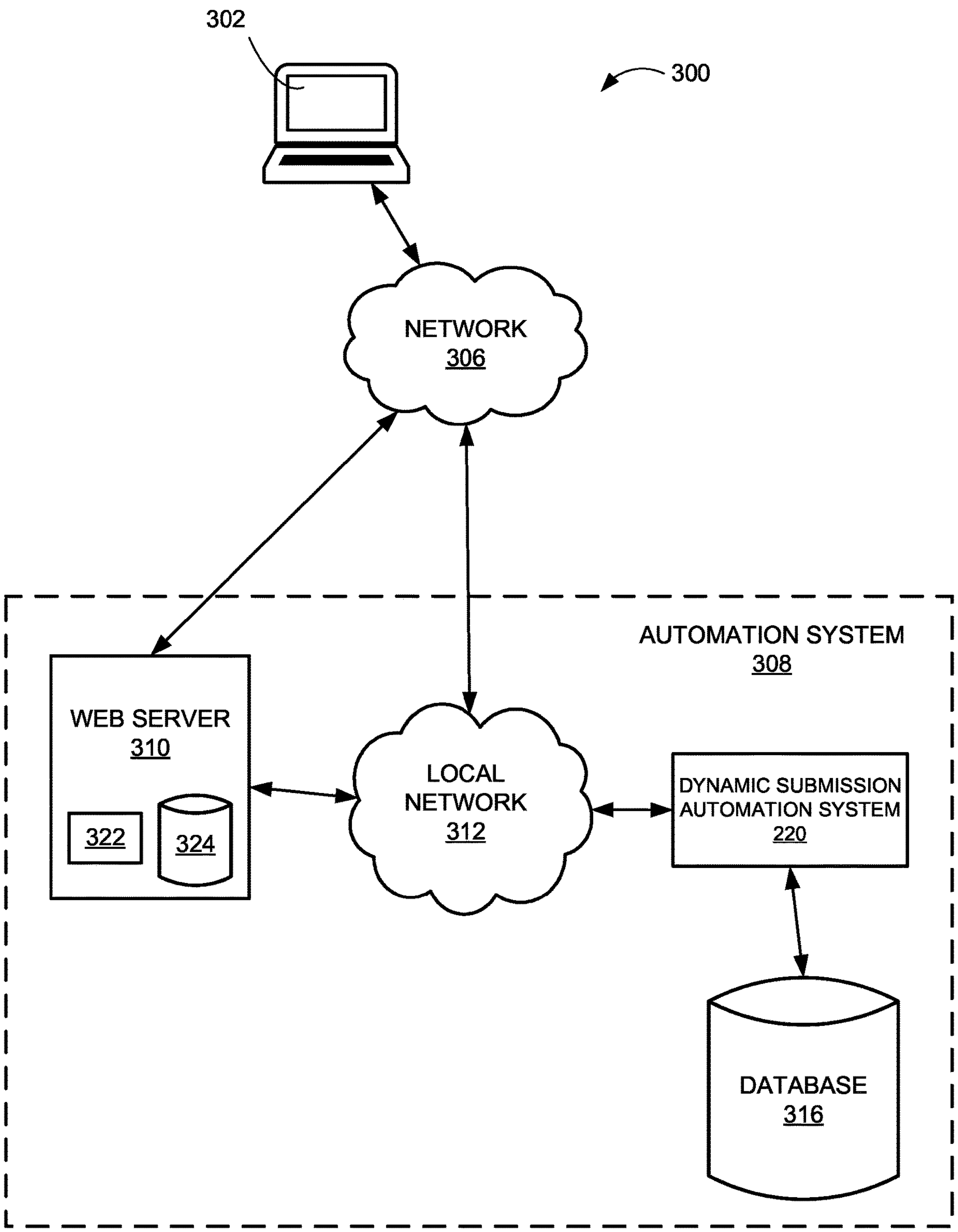
FIG. 3 is a block diagram of an example system that may be used to provide dynamically automated submissions, according to an example implementation of the disclosed technology.

FIG. 2 is a block diagram of an example dynamic submission automation system 220 used to dynamically automate submissions according to an example implementation of the disclosed technology. According to some embodiments, the user device 302 and web server 310, as depicted in FIG. 3 and described below, may have a similar structure and components that are similar to those described with respect to dynamic submission automation system 220 shown in FIG. 2. As shown, the dynamic submission automation system 220 may include a processor 210, an input/output (I/O) device 270, a memory 230 containing an operating system (OS) 240 and a program 250. In certain example implementations, the dynamic submission automation system 220 may be a single server or may be configured as a distributed computer system including multiple servers or computers that interoperate to perform one or more of the processes and functionalities associated with the disclosed embodiments. In some embodiments dynamic submission automation system 220 may be one or more servers from a serverless or scaling server system. In some embodiments, the dynamic submission automation system 220 may further include a peripheral interface, a transceiver, a mobile network interface in communication with the processor 210, a bus configured to facilitate communication between the various components of the dynamic submission automation system 220, and a power source configured to power one or more components of the dynamic submission automation system 220.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 230.

The processor 210 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 210 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 210 may be a single core processor that is configured with virtual processing technologies. In certain embodiments, the processor 210 may use logical processors to simultaneously execute and control multiple processes. The processor 210 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the dynamic submission automation system 220 may include one or more storage devices configured to store information used by the processor 210 (or other components) to perform certain functions related to the disclosed embodiments. In one example, the dynamic submission automation system 220 may include the memory 230 that includes instructions to enable the processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The dynamic submission automation system 220 may include a memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, the dynamic submission automation system 220 may include the memory 230 that may include one or more programs 250 to perform one or more functions of the disclosed embodiments. For example, in some embodiments, the dynamic submission automation system 220 may additionally manage dialogue and/or other interactions with the customer via a program 250.

The processor 210 may execute one or more programs 250 located remotely from the dynamic submission automation system 220. For example, the dynamic submission automation system 220 may access one or more remote programs that, when executed, perform functions related to disclosed embodiments.

The memory 230 may include one or more memory devices that store data and instructions used to perform one or more features of the disclosed embodiments. The memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 230 may include software components that, when executed by the processor 210, perform one or more processes consistent with the disclosed embodiments. In some embodiments, the memory 230 may include a dynamic submission automation system database 260 for storing related data to enable the dynamic submission automation system 220 to perform one or more of the processes and functionalities associated with the disclosed embodiments.

The dynamic submission automation system database 260 may include stored data relating to status data (e.g., average session duration data, location data, idle time between sessions, and/or average idle time between sessions) and historical status data. According to some embodiments, the functions provided by the dynamic submission automation system database 260 may also be provided by a database that is external to the dynamic submission automation system 220, such as the database 316 as shown in FIG. 3.

The dynamic submission automation system 220 may also be communicatively connected to one or more memory devices (e.g., databases) locally or through a network. The remote memory devices may be configured to store information and may be accessed and/or managed by the dynamic submission automation system 220. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The dynamic submission automation system 220 may also include one or more I/O devices 270 that may comprise one or more interfaces for receiving signals or input from devices and providing signals or output to one or more devices that allow data to be received and/or transmitted by the dynamic submission automation system 220. For example, the dynamic submission automation system 220 may include interface components, which may provide interfaces to one or more input devices, such as one or more keyboards, mouse devices, touch screens, track pads, trackballs, scroll wheels, digital cameras, microphones, sensors, and the like, that enable the dynamic submission automation system 220 to receive data from a user (such as, for example, via the user device 302).

In examples of the disclosed technology, the dynamic submission automation system 220 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

The dynamic submission automation system 220 may contain programs that train, implement, store, receive, retrieve, and/or transmit one or more machine learning models. Machine learning models may include a neural network model, a generative adversarial model (GAN), a recurrent neural network (RNN) model, a deep learning model (e.g., a long short-term memory (LSTM) model), a random forest model, a convolutional neural network (CNN) model, a support vector machine (SVM) model, logistic regression, XGBoost, and/or another machine learning model. Models may include an ensemble model (e.g., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. The dynamic submission automation system 220 may be configured to adjust model parameters during training. Model parameters may include weights, coefficients, offsets, or the like. Training may be supervised or unsupervised.

The dynamic submission automation system 220 may be configured to train machine learning models by optimizing model parameters and/or hyperparameters (hyperparameter tuning) using an optimization technique, consistent with disclosed embodiments. Hyperparameters may include training hyperparameters, which may affect how training of the model occurs, or architectural hyperparameters, which may affect the structure of the model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. The dynamic submission automation system 220 may be configured to optimize statistical models using known optimization techniques.

Furthermore, the dynamic submission automation system 220 may include programs configured to retrieve, store, and/or analyze properties of data models and datasets. For example, dynamic submission automation system 220 may include or be configured to implement one or more data-profiling models. A data-profiling model may include machine learning models and statistical models to determine the data schema and/or a statistical profile of a dataset (e.g., to profile a dataset), consistent with disclosed embodiments. A data-profiling model may include an RNN model, a CNN model, or other machine-learning model.

The dynamic submission automation system 220 may include algorithms to determine a data type, key-value pairs, row-column data structure, statistical distributions of information such as keys or values, or other property of a data schema may be configured to return a statistical profile of a dataset (e.g., using a data-profiling model). The dynamic submission automation system 220 may be configured to implement univariate and multivariate statistical methods. The dynamic submission automation system 220 may include a regression model, a Bayesian model, a statistical model, a linear discriminant analysis model, or other classification model configured to determine one or more descriptive metrics of a dataset. For example, dynamic submission automation system 220 may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

The dynamic submission automation system 220 may be configured to return a statistical profile of a dataset (e.g., using a data-profiling model or other model). A statistical profile may include a plurality of descriptive metrics. For example, the statistical profile may include an average, a mean, a standard deviation, a range, a moment, a variance, a covariance, a covariance matrix, a similarity metric, or any other statistical metric of the selected dataset. In some embodiments, dynamic submission automation system 220 may be configured to generate a similarity metric representing a measure of similarity between data in a dataset. A similarity metric may be based on a correlation, covariance matrix, a variance, a frequency of overlapping values, or other measure of statistical similarity.

The dynamic submission automation system 220 may be configured to generate a similarity metric based on data model output, including data model output representing a property of the data model. For example, dynamic submission automation system 220 may be configured to generate a similarity metric based on activation function values, embedding layer structure and/or outputs, convolution results, entropy, loss functions, model training data, or other data model output). For example, a synthetic data model may produce first data model output based on a first dataset and a produced data model output based on a second dataset, and a similarity metric may be based on a measure of similarity between the first data model output and the second-data model output. In some embodiments, the similarity metric may be based on a correlation, a covariance, a mean, a regression result, or other similarity between a first data model output and a second data model output. Data model output may include any data model output as described herein or any other data model output (e.g., activation function values, entropy, loss functions, model training data, or other data model output). In some embodiments, the similarity metric may be based on data model output from a subset of model layers. For example, the similarity metric may be based on data model output from a model layer after model input layers or after model embedding layers. As another example, the similarity metric may be based on data model output from the last layer or layers of a model.

The dynamic submission automation system 220 may be configured to classify a dataset. Classifying a dataset may include determining whether a dataset is related to another datasets. Classifying a dataset may include clustering datasets and generating information indicating whether a dataset belongs to a cluster of datasets. In some embodiments, classifying a dataset may include generating data describing the dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data may be based on a similarity metric. Edge data may indicate a similarity between datasets and/or a hierarchical relationship (e.g., a data lineage, a parent-child relationship). In some embodiments, classifying a dataset may include generating graphical data, such as anode diagram, a tree diagram, or a vector diagram of datasets. Classifying a dataset may include estimating a likelihood that a dataset relates to another dataset, the likelihood being based on the similarity metric.

The dynamic submission automation system 220 may include one or more data classification models to classify datasets based on the data schema, statistical profile, and/or edges. A data classification model may include a convolutional neural network, a random forest model, a recurrent neural network model, a support vector machine model, or another machine learning model. A data classification model may be configured to classify data elements as actual data, synthetic data, related data, or any other data category. In some embodiments, dynamic submission automation system 220 is configured to generate and/or train a classification model to classify a dataset, consistent with disclosed embodiments.

While the dynamic submission automation system 220 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the dynamic submission automation system 220 may include a greater or lesser number of components than those illustrated.

FIG. 3 is a block diagram of an example system that may be used to view and interact with automation system 308, according to an example implementation of the disclosed technology. The components and arrangements shown in FIG. 3 are not intended to limit the disclosed embodiments as the components used to implement the disclosed processes and features may vary. As shown, automation system 308 may interact with a user device 302 via a network 306. In certain example implementations, the automation system 308 may include a local network 312, a dynamic submission automation system 220, a web server 310, and a database 316.

In some embodiments, a user may operate the user device 302. The user device 302 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 306 and ultimately communicating with one or more components of the automation system 308. In some embodiments, the user device 302 may include or incorporate electronic communication devices for hearing or vision impaired users.

Users may include individuals such as, for example, subscribers, clients, prospective clients, or customers of an entity associated with an organization, such as individuals who have obtained, will obtain, or may obtain a product, service, or consultation from or conduct a transaction in relation to an entity associated with the automation system 308. According to some embodiments, the user device 302 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The network 306 may be of any suitable type, including individual connections via the internet such as cellular or WiFi networks. In some embodiments, the network 306 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 306 may include any type of computer networking arrangement used to exchange data. For example, the network 306 may be the Internet, a private data network, virtual private network (VPN) using a public network, and/or other suitable connection(s) that enable(s) components in the system 300 environment to send and receive information between the components of the system 300. The network 306 may also include a PSTN and/or a wireless network.

The automation system 308 may be associated with and optionally controlled by one or more entities such as a business, corporation, individual, partnership, or any other entity that provides one or more of goods, services, and consultations to individuals such as customers. In some embodiments, the automation system 308 may be controlled by a third party on behalf of another business, corporation, individual, partnership, etc. The automation system 308 may include one or more servers and computer systems for performing one or more functions associated with products and/or services that the organization provides.

Web server 310 may include a computer system configured to generate and provide one or more websites accessible to customers, as well as any other individuals involved in access system 308's normal operations. Web server 310 may include a computer system configured to receive communications from user device 302 via for example, a mobile application, a chat program, an instant messaging program, a voice-to-text program, an SMS message, email, or any other type or format of written or electronic communication. Web server 310 may have one or more processors 322 and one or more web server databases 324, which may be any suitable repository of website data. Information stored in web server 310 may be accessed (e.g., retrieved, updated, and added to) via local network 312 and/or network 306 by one or more devices or systems of system 300. In some embodiments, web server 310 may host websites or applications that may be accessed by the user device 302. For example, web server 310 may host a financial service provider website that a user device may access by providing an attempted login that is authenticated by the dynamic submission automation system 220. According to some embodiments, web server 310 may include software tools, similar to those described with respect to user device 302 above, that may allow web server 310 to obtain network identification data from user device 302. The web server may also be hosted by an online provider of website hosting, networking, cloud, or backup services, such as Microsoft Azure™ or Amazon Web Services™.

The local network 312 may include any type of computer networking arrangement used to exchange data in a localized area, such as WiFi, Bluetooth™, Ethernet, and other suitable network connections that enable components of the automation system 308 to interact with one another and to connect to the network 306 for interacting with components in the system 300 environment. In some embodiments, the local network 312 may include an interface for communicating with or linking to the network 306. In other embodiments, certain components of the automation system 308 may communicate via the network 306, without a separate local network 306.

The automation system 308 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 302 may be able to access automation system 308 using the cloud computing environment. User device 302 may be able to access automation system 308 using specialized software. The cloud computing environment may eliminate the need to install specialized software on user device 302.

In accordance with certain example implementations of the disclosed technology, the automation system 308 may include one or more computer systems configured to compile data from a plurality of sources the dynamic submission automation system 220, web server 310, and/or the database 316. The dynamic submission automation system 220 may correlate compiled data, analyze the compiled data, arrange the compiled data, generate derived data based on the compiled data, and store the compiled and derived data in a database such as the database 316. According to some embodiments, the database 316 may be a database associated with an organization and/or a related entity that stores a variety of information relating to customers, transactions, ATM, and business operations. The database 316 may also serve as a back-up storage device and may contain data and information that is also stored on, for example, database 260, as discussed with reference to FIG. 2.

Example Use Case

The following example use case describes an example of a typical user flow pattern. This section is intended solely for explanatory purposes and not in limitation.

In one example, John, who works for a company, decides to create multiple submissions on a website. The website relates to dealers, and John needs to create the multiple submissions to confirm if a plurality of dealers has submitted payments. John has created an excel spreadsheet with the information of each dealer and related transaction listed in a row on the excel spreadsheet. John has the dynamic submission automation system 220 installed in a browser as an extension. John sends the excel spreadsheet to the dynamic submission automation system 220. The dynamic submission automation system 220 receives the excel spreadsheet from John through the browser extension. The dynamic submission automation system 220 extracts column data from the excel spreadsheet and determines, using a first machine learning model, one or more suggested associations for the fields on the webpage based on data types for the fields and data types for each of the columns in the spreadsheet. The dynamic submission automation system 220 then determines, using a second machine learning model, one or more suggested associations for the fields based on column names of the extracted column data and field names of the fields on the webpage. In response to determining one or more suggested associations, the dynamic submission automation system 220 sends the one or more suggested associations to John through the browser extension. John can then review each of the one or more suggested associations and can send the dynamic submission automation system 220 accepted suggested associations. The dynamic submission automation system 220 can then transmit the one or more submissions for each row in the excel spreadsheet using the one or more suggested associations and the accepted suggested associations. In other examples, John may provide alternative associations that the dynamic submission automation system 220 can use while transmitting the one or more submissions for each row in the excel spreadsheet. Once all the submissions are submitted, John can choose to proceed with additional submissions from a different excel spreadsheet or can close out of the browser. If John chooses to proceed with additional submissions from different excel spreadsheets, the dynamic submission automation system 220 can recognize the previously accepted suggested associations and include the previously accepted suggested associations in the one or more suggested associations for the additional submissions. The dynamic submission automation system 220 can also use the previously accepted suggested associations as part of the one or more suggested associations when the different excel spreadsheet is in the same format as the excel spreadsheet previously analyzed.

In some examples, disclosed systems or methods may involve one or more of the following clauses:

Clause 1: A dynamic submission automation system comprising: one or more processors; and memory in communication with the one or more processors and storing instructions that are configured to cause the dynamic submission automation system to: receive, from a user device, tabular data and one or more associations of columns from the tabular data to fields on a webpage for one or more submissions; extract column data from the tabular data; determine, using a first machine learning model, one or more suggested associations for the fields on the webpage based on data types for the fields and the extracted column data; determine, using a second machine learning model, one or more suggested associations for the fields on the webpage based on field names on the webpage and column names of the extracted column data; responsive to determining one or more suggested associations, sending to the user device the one or more suggested associations for the fields on the webpage; receive, from the user device, accepted suggested associations for the fields on the webpage; and transmit, via an API, one or more submissions for each row in the tabular data using the one or more suggested associations and the accepted suggested associations.

Clause 2: The dynamic submission automation system of claim 1, wherein the tabular data and one or more associations is received from the user device via a browser extension, a mobile application, or both.

Clause 3: The dynamic submission automation system of claim 1, wherein receiving the tabular data further comprises: receiving a location of the tabular data; and transmitting an API call with the location of the tabular data to retrieve the tabular data.

Clause 4: The dynamic submission automation system of claim 1, wherein the first machine learning model determines the one or more suggested associations by: determining a required data type for a field; and determining whether one or more columns of the extracted column data includes the required data type.

Clause 5: The dynamic submission automation system of claim 1, wherein the second machine learning model determines the one or more suggested associations by determining whether one or more column names are within a predetermined contextual range of the field names.

Clause 6: A dynamic submission automation system comprising: one or more processors; and memory in communication with the one or more processors and storing instructions that are configured to cause the dynamic submission automation system to: receive, from a database, tabular data for one or more submissions; extract column data from the tabular data; determine, using a first machine learning model, one or more suggested associations for fields on a webpage based on data types for the fields and the extracted column data; responsive to determining one or more suggested associations, sending to a user device the one or more suggested associations for the fields on the webpage; receive, from the user device, one or more accepted suggested associations for the fields on the webpage; and transmit, via an API, one or more submissions for each row in the tabular data using the one or more suggested associations and the one or more accepted suggested associations.

Clause 7: The dynamic submission automation system of claim 6, wherein receiving the tabular data further comprises transmitting an API call with a location of the tabular data to retrieve the tabular data.

Clause 8: The dynamic submission automation system of claim 6, wherein the first machine learning model determines the one or more suggested associations by: determining a required data type for a field; and determining whether one or more columns of the extracted column data includes the required data type.

Clause 9: The dynamic submission automation system of claim 6, wherein the instructions, when executed by the one or more processors, are further configured to cause the dynamic submission automation system to: determine, using a second machine learning model, one or more suggested associations for the fields on the webpage based on field names on the webpage and column names of the extracted column data; and responsive to determining one or more suggested associations, sending to the user device the one or more suggested associations for the fields on the webpage.

Clause 10: The dynamic submission automation system of claim 9, wherein the second machine learning model determines the one or more suggested associations by determining whether one or more column names are within a predetermined contextual range of the field names.

Clause 11: The dynamic submission automation system of claim 6, wherein the tabular data is received from the user device via a browser extension, a mobile application, or both.

Clause 12: The dynamic submission automation system of claim 6, wherein the instructions, when executed by the one or more processors, are further configured to cause the dynamic submission automation system to: receive, from a user device, one or more associations of columns from the tabular data to fields on the webpage for the one or more submissions.

Clause 13: A dynamic submission automation system comprising: one or more processors; and memory in communication with the one or more processors and storing instructions that are configured to cause the dynamic submission automation system to: receive, from a user device, tabular data and one or more associations of columns from the tabular data to fields on a webpage for one or more submissions; extract column data and row data from the tabular data; and transmit, via an API, one or more submissions for each row in the tabular data using the one or more associations of columns.

Clause 14: The dynamic submission automation system of claim 13, wherein the tabular data and one or more associations is received from the user device via a browser extension, a mobile application, or both.

Clause 15: The dynamic submission automation system of claim 13, wherein receiving the tabular data further comprises: receiving a location of the tabular data; and transmitting an API call with the location of the tabular data to retrieve the tabular data.

Clause 16: The dynamic submission automation system of claim 13, wherein the instructions, when executed by the one or more processors, are further configured to cause the dynamic submission automation system to: determine, using a first machine learning model, one or more suggested associations for the fields on the webpage based on data types for the fields and the extracted column data; responsive to determining one or more suggested associations, sending to the user device the one or more suggested associations for the fields on the webpage; and receive, from the user device, accepted suggested associations for the fields on the webpage.

Clause 17: The dynamic submission automation system of claim 16, wherein the first machine learning model determines the one or more suggested associations by: determining a required data type for a field; and determining whether one or more columns of the extracted column data includes the required data type.

Clause 18: The dynamic submission automation system of claim 13, wherein the instructions, when executed by the one or more processors, are further configured to cause the dynamic submission automation system to: determine, using a second machine learning model, one or more suggested associations for the fields on the webpage based on field names on the webpage and column names of the extracted column data; responsive to determining one or more suggested associations, sending to the user device the one or more suggested associations for the fields on the webpage; and receive, from the user device, accepted suggested associations for the fields on the webpage.

Clause 19: The dynamic submission automation system of claim 18, wherein the second machine learning model determines the one or more suggested associations by determining whether one or more column names are within a predetermined contextual range of the field names.

Clause 20: The dynamic submission automation system of claim 13, wherein the tabular data is received from the user device via clickable elements proximate to the fields on the webpage.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A dynamic submission automation system comprising:

one or more processors; and memory in communication with the one or more processors and storing instructions that are configured to cause the dynamic submission automation system to:

receive, from a user device, tabular data and one or more associations of columns from the tabular data to fields on a webpage for one or more submissions;

extract column data from the tabular data;

determine, using a first machine learning model, one or more suggested associations for the fields on the webpage based on data types for the fields and the extracted column data;

determine, using a second machine learning model, one or more suggested associations for the fields on the webpage based on field names on the webpage and column names of the extracted column data;

responsive to determining one or more suggested associations, sending to the user device the one or more suggested associations for the fields on the webpage;

receive, from the user device, accepted suggested associations for the fields on the webpage; and transmit, via an API, one or more submissions for each row in the tabular data using the one or more suggested associations and the accepted suggested associations.

2. The dynamic submission automation system of claim 1, wherein the tabular data and one or more associations is received from the user device via a browser extension, a mobile application, or both.

3. The dynamic submission automation system of claim 1, wherein receiving the tabular data further comprises:

receiving a location of the tabular data; and transmitting an API call with the location of the tabular data to retrieve the tabular data.

4. The dynamic submission automation system of claim 1, wherein the first machine learning model determines the one or more suggested associations by:

determining a required data type for a field; and determining whether one or more columns of the extracted column data includes the required data type.

5. The dynamic submission automation system of claim 1, wherein the second machine learning model determines the one or more suggested associations by determining whether one or more column names are within a predetermined contextual range of the field names.

6. A dynamic submission automation system comprising:

one or more processors; and memory in communication with the one or more processors and storing instructions that are configured to cause the dynamic submission automation system to:

receive, from a database, tabular data for one or more submissions;

extract column data from the tabular data;

determine, using a first machine learning model, one or more suggested associations for fields on a webpage based on data types for the fields and the extracted column data;

responsive to determining one or more suggested associations, sending to a user device the one or more suggested associations for the fields on the webpage;

receive, from the user device, one or more accepted suggested associations for the fields on the webpage; and transmit, via an API, one or more submissions for each row in the tabular data using the one or more suggested associations and the one or more accepted suggested associations.

7. The dynamic submission automation system of claim 6, wherein receiving the tabular data further comprises transmitting an API call with a location of the tabular data to retrieve the tabular data.

8. The dynamic submission automation system of claim 6, wherein the first machine learning model determines the one or more suggested associations by:

determining a required data type for a field; and determining whether one or more columns of the extracted column data includes the required data type.

9. The dynamic submission automation system of claim 6, wherein the instructions, when executed by the one or more processors, are further configured to cause the dynamic submission automation system to:

determine, using a second machine learning model, one or more suggested associations for the fields on the webpage based on field names on the webpage and column names of the extracted column data; and responsive to determining one or more suggested associations, sending to the user device the one or more suggested associations for the fields on the webpage.

10. The dynamic submission automation system of claim 9, wherein the second machine learning model determines the one or more suggested associations by determining whether one or more column names are within a predetermined contextual range of the field names.

11. The dynamic submission automation system of claim 6, wherein the tabular data is received from the user device via a browser extension, a mobile application, or both.

12. The dynamic submission automation system of claim 6, wherein the instructions, when executed by the one or more processors, are further configured to cause the dynamic submission automation system to:

receive, from a user device, one or more associations of columns from the tabular data to fields on the webpage for the one or more submissions.

13. A dynamic submission automation system comprising:

one or more processors; and memory in communication with the one or more processors and storing instructions that are configured to cause the dynamic submission automation system to:

receive, from a user device, tabular data and one or more associations of columns from the tabular data to fields on a webpage for one or more submissions;

extract column data and row data from the tabular data;

determine, using a first machine learning model, one or more suggested associations for the fields on the webpage based on pattern types identified using one or more regular expressions for the fields and the extracted column data;

responsive to determining one or more suggested associations, sending to the user device the one or more suggested associations for the fields on the webpage;

receive, from the user device, accepted suggested associations for the fields on the webpage; and transmit, via an API, one or more submissions for each row in the tabular data using the one or more associations of columns.

14. The dynamic submission automation system of claim 13, wherein the tabular data and one or more associations is received from the user device via a browser extension, a mobile application, or both.

15. The dynamic submission automation system of claim 13, wherein receiving the tabular data further comprises:

receiving a location of the tabular data; and transmitting an API call with the location of the tabular data to retrieve the tabular data.

16. The dynamic submission automation system of claim 13, wherein the instructions, when executed by the one or more processors, are further configured to cause the dynamic submission automation system to:

determine, using the first machine learning model, one or more suggested associations for the fields on the webpage based on data types for the fields and the extracted column data;

responsive to determining one or more suggested associations, sending to the user device the one or more suggested associations for the fields on the webpage; and receive, from the user device, accepted suggested associations for the fields on the webpage.

17. The dynamic submission automation system of claim 16, wherein the first machine learning model determines the one or more suggested associations by:

determining a required data type for a field; and determining whether one or more columns of the extracted column data includes the required data type.

18. The dynamic submission automation system of claim 13, wherein the instructions, when executed by the one or more processors, are further configured to cause the dynamic submission automation system to:

determine, using a second machine learning model, one or more suggested associations for the fields on the webpage based on field names on the webpage and column names of the extracted column data;

responsive to determining one or more suggested associations, sending to the user device the one or more suggested associations for the fields on the webpage; and receive, from the user device, accepted suggested associations for the fields on the webpage.

19. The dynamic submission automation system of claim 18, wherein the second machine learning model determines the one or more suggested associations by determining whether one or more column names are within a predetermined contextual range of the field names.

* * * * *